United States Patent
Grimminger et al.

(10) Patent No.: US 9,322,356 B2
(45) Date of Patent: Apr. 26, 2016

(54) METHOD AND CONTROL UNIT FOR OPERATING A VALVE

(75) Inventors: Christian Grimminger, Leonberg (DE); Egbert Fuchs, Stuttgart-Feuerbach (DE); Helerson Kemmer, Vaihingen (DE); Holger Rapp, Ditzingen (DE); Thomas Gann, Gaertringen (DE); Anh-Tuan Hoang, El Paso, TX (US); Ralph Kober, Gerlingen (DE); Christian Szonn, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1060 days.

(21) Appl. No.: 13/499,476

(22) PCT Filed: Sep. 10, 2010

(86) PCT No.: PCT/EP2010/063305
§ 371 (c)(1),
(2), (4) Date: Jun. 15, 2012

(87) PCT Pub. No.: WO2011/039043
PCT Pub. Date: Apr. 7, 2011

(65) Prior Publication Data
US 2012/0247428 A1    Oct. 4, 2012

(30) Foreign Application Priority Data

Oct. 2, 2009   (DE) .......................... 10 2009 045 309

(51) Int. Cl.
*G06F 7/00*    (2006.01)
*G06F 17/00*   (2006.01)
(Continued)

(52) U.S. Cl.
CPC .............. *F02D 41/40* (2013.01); *F02D 41/247*
(2013.01); *F02D 41/2438* (2013.01); *F02D 2041/2055* (2013.01); *Y02T 10/44* (2013.01)

(58) Field of Classification Search
CPC ............ F02D 2041/2055; F02D 41/40; F02D 41/247; F02D 41/2438; Y02T 10/44
USPC .................. 701/105; 123/472, 490, 500, 503; 73/114.45, 114.49
See application file for complete search history.

(56) References Cited

U.S. PATENT DOCUMENTS 8,887,560 B2 * 11/2014 Beer et al. .................. 73/114.49
8,893,685 B2 * 11/2014 Melis .................... F02D 41/401
                                                    123/478

(Continued)

FOREIGN PATENT DOCUMENTS

CN          1346933       5/2002
CN          101377165     3/2009

(Continued)

OTHER PUBLICATIONS

International Search Report for PCT/EP2010/063305, dated Dec. 27, 2010.

*Primary Examiner* — Stephen K Cronin
*Assistant Examiner* — David Hamaoui
(74) *Attorney, Agent, or Firm* — Kenyon & Kenyon LLP

(57) ABSTRACT

In a method for operating a valve, e.g., a fuel injector of an internal combustion engine in a motor vehicle which is activated with the aid of an actuator, the actuator is activated using a control variable which has a predetermined control period. The control period is formed as a function of a setpoint value for a closing delay time of the valve which characterizes a time difference between an end of the control period and a closing point in time of the valve.

8 Claims, 7 Drawing Sheets

(51) Int. Cl.
  *F02M 51/00* (2006.01)
  *F02D 41/40* (2006.01)
  *F02D 41/24* (2006.01)
  *F02D 41/20* (2006.01)

(56) References Cited

U.S. PATENT DOCUMENTS

2008/0125952 A1* 5/2008 Stoecklein et al. ........... 701/103
2010/0263632 A1* 10/2010 Miyake et al. ................ 123/476
2012/0239278 A1* 9/2012 Becker et al. ................ 701/105

FOREIGN PATENT DOCUMENTS

| DE | 10 2005 042 110 | 3/2007 |
| DE | 10 2008 031 477 | 3/2009 |
| DE | 10 2007 062 279 | 6/2009 |
| EP | 0 310 289 | 4/1989 |
| WO | WO 2010/079027 | 7/2010 |

* cited by examiner

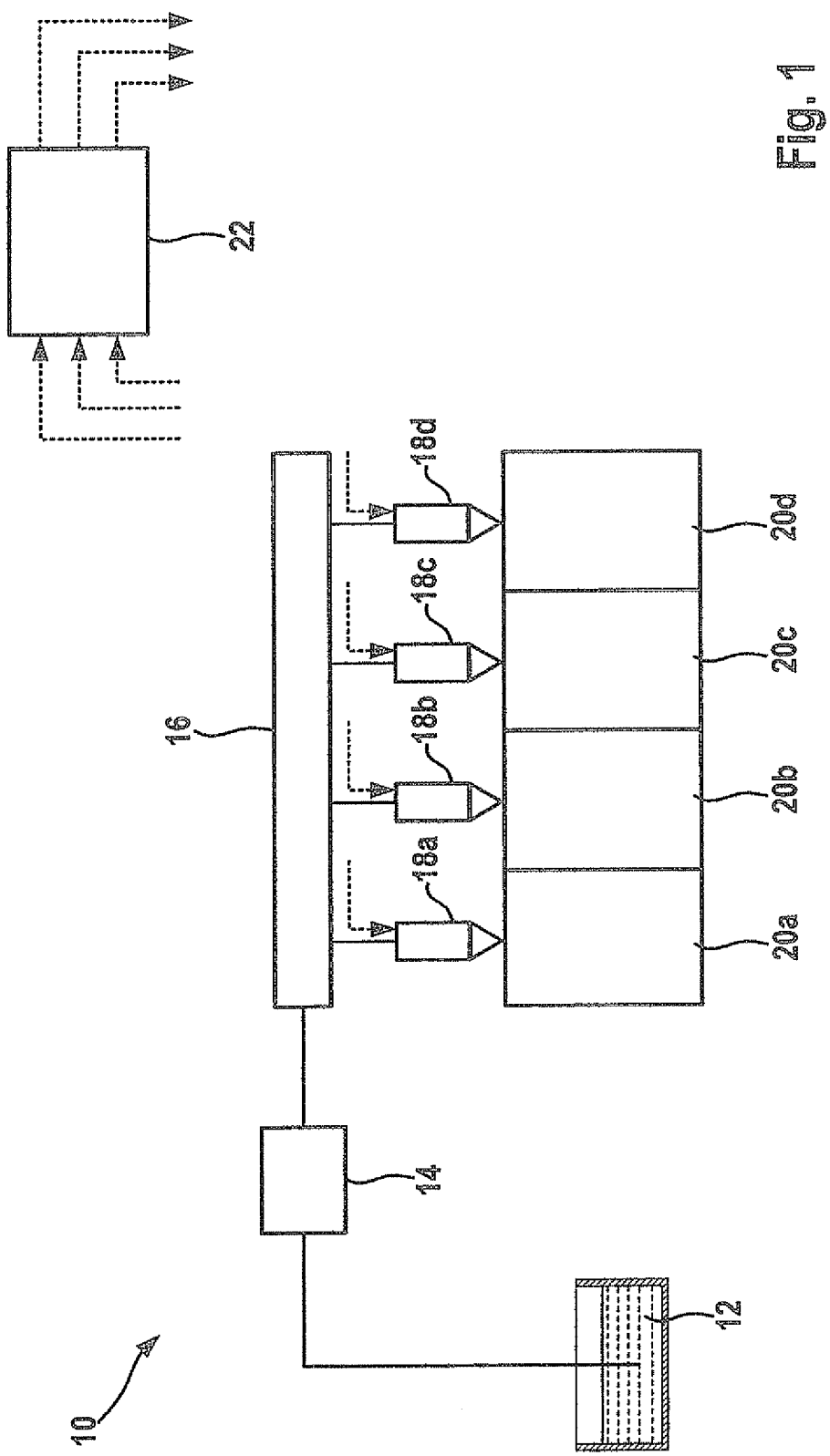

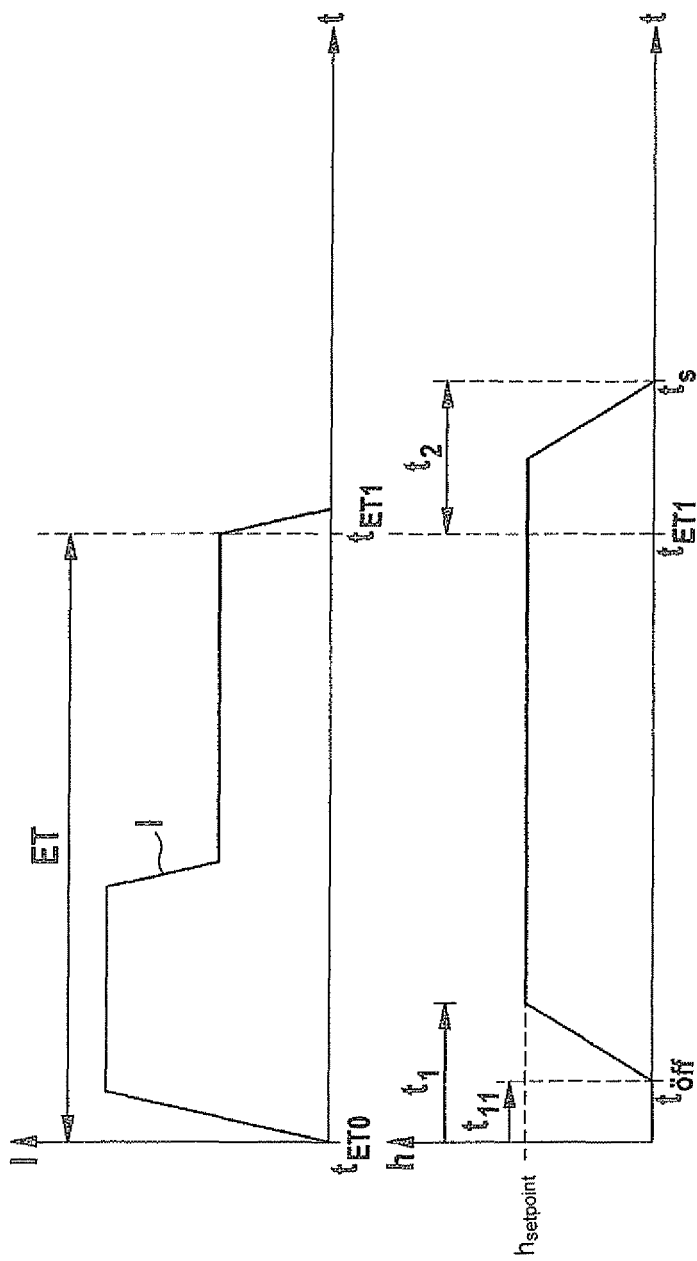

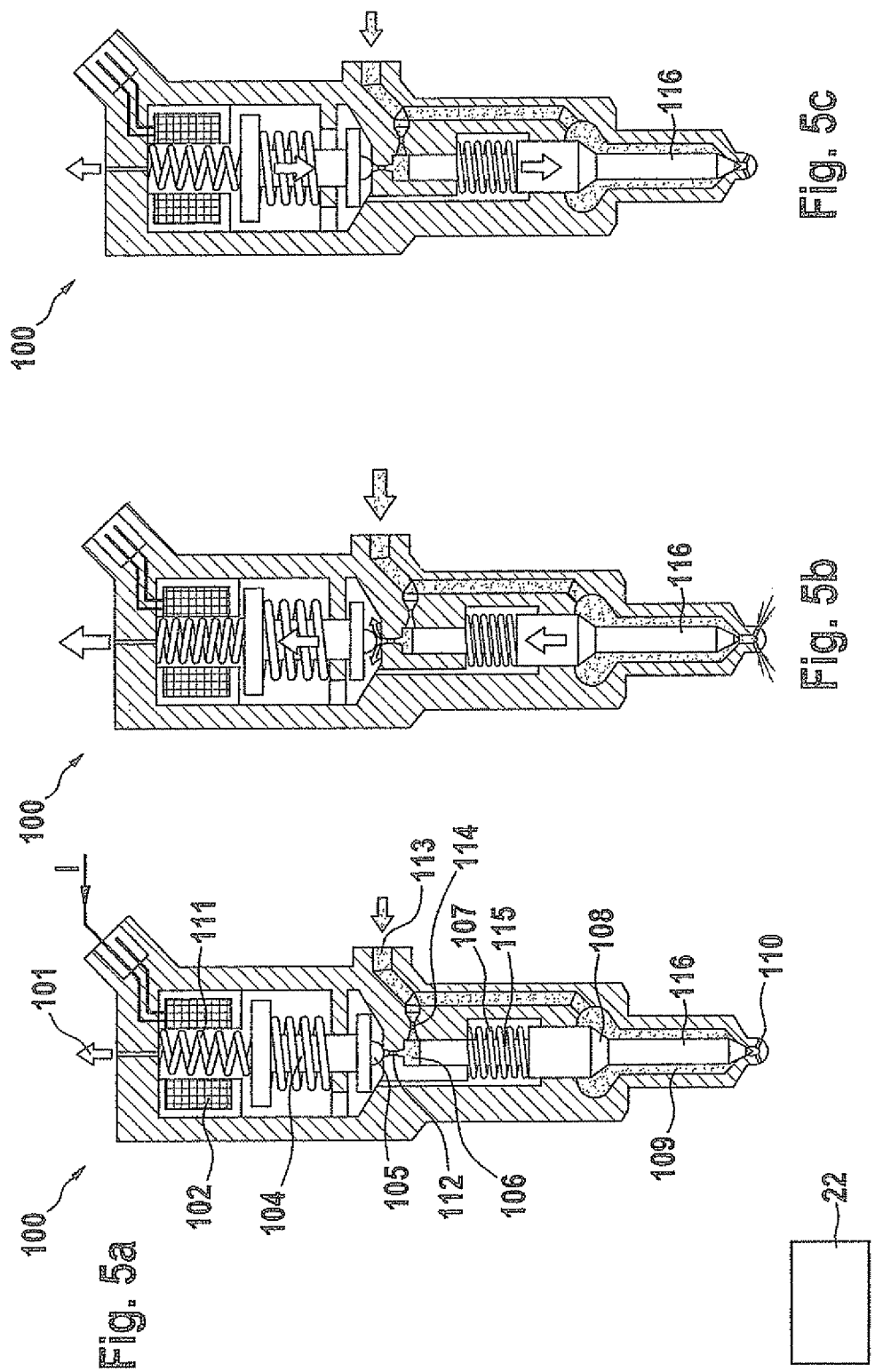

METHOD AND CONTROL UNIT FOR OPERATING A VALVE

BACKGROUND OF THE INVENTION

1. Field of the Invention

The present invention relates to a control unit and a method for operating a valve, e.g., a fuel injector of an internal combustion engine in a motor vehicle, which is activated with the aid of an actuator, in which the actuator is activated using a control variable which has a control period.

2. Description of Related Art

Methods and control units of the aforementioned type are used, for example, in high-pressure injectors for gasoline direct injection, in which a motion of a valve needle is controlled, for example, by energizing a magnetic circuit. The magnetic circuit is a component of an electromagnetic actuator which exerts a magnetic force on the valve needle when energized. Common types of high-pressure injectors are designed in such a way that the energization of the solenoid of the electromagnetic actuator causes the injector to open, i.e., lifts the valve needle from its closed position and subsequently holds the valve needle at a lift stop corresponding to its open position. When the energization ends, initially the magnetic force rapidly decreases in a manner known per se, so that a return spring which acts upon the valve needle in the closing direction accelerates the valve needle toward its closed position. The closing process ends when the valve needle reaches its valve seat. After this point in time the return spring force no longer has an accelerating effect on the valve needle, and acts only as a sealing force which transfers the valve needle to its valve seat.

In addition to the motion characteristic of the valve needle and the stroke throttle curve of the valve, the quantity of fuel injected during the above-described control process is determined primarily by an opening duration of the valve, i.e., the time interval between the lifting of the valve needle from its closed position and the return to its closed position.

However, the hydraulic opening duration of the valve is usually not directly known in a control unit which controls the valve; rather, only a control period of the actuator which drives the valve needle is known. There is a so-called opening delay time between a start of the control period and the actual hydraulic opening of the injector, and there is a so-called closing delay time between an end of the control period and the point in time of the actual hydraulic closing of the injector.

These delay times of the valve are not known, and instead are a function of operating and setting parameters of the valve and other criteria. In particular for very short desired opening durations of the valve, in which the valve needle does not reach a lift stop which corresponds to its completely open position, but instead undergoes a ballistic trajectory, the metering accuracy of the conventional systems is inadequate.

BRIEF SUMMARY OF THE INVENTION

The present invention improves methods and control units of the type stated at the outset in such a way that more precise injection is possible.

This is achieved according to the present invention in that the control period is formed as a function of a setpoint value for a closing delay time of the valve which characterizes a time difference between an end of the control period and a closing point in time of the valve.

According to the present invention, it has been recognized that taking the setpoint value for the closing delay time into account allows more precise metering of a fluid to be injected, in particular also in an operating range of the injector in which the valve needle undergoes an essentially ballistic trajectory.

In one particularly preferred specific embodiment of the operating method according to the present invention, it is provided that an actual value of the closing delay time is ascertained, in particular determined metrologically, that a system deviation between the setpoint value and the actual value for the closing delay time is formed, and that the setpoint value for the control period is modified as a function of the system deviation.

Tests by the present applicant have shown that by using such a control concept it is possible to significantly improve precision in the injection of a fluid, in particular also in the ballistic operating range of the injector or its valve needle. According to the present invention, by taking into account the system deviation, which also includes the actual value of the closing delay time, it is advantageously possible to modify the control signal, in particular the control period, for the operation of the valve in such a way that even temporally variable closing delay times may be counteracted, in particular, for example, by changing the actual (setpoint) control period of the valve.

The operating method according to the present invention may advantageously be used for operating valves in which a component, in particular a valve needle, which is driven by the actuator undergoes, at least partially, a ballistic trajectory as the result of activation using the control variable.

The operating method according to the present invention may be applied in a particularly advantageous manner for so-called directly operated injectors, in which an actuator, for example an electromagnetic actuator, acts directly on the valve needle, as is frequently the case for gasoline direct injection systems, for example.

The operating method according to the present invention is also applicable to injectors in which an actuator, for example an electromagnetic actuator, does not act directly on the valve needle, but instead the valve needle is driven, for example with the aid of a control valve situated between the electromagnetic actuator and the valve needle, and a corresponding hydraulic functional chain. Such injectors are currently in frequent use in common rail diesel injection systems.

As another aspect of the present invention, a control unit for implementing the method is provided.

In addition, the implementation of the method according to the present invention in the form of a computer program is of particular importance.

BRIEF DESCRIPTION OF THE DRAWINGS

FIG. 1 shows a schematic illustration of an internal combustion engine having multiple injectors operated according to the present invention.

FIG. 3b shows a time curve of operating variables of an injector operated in a conventional manner.

FIGS. 5a, 5b, and 5c show various operating states of an injector, which has a control valve, for carrying out the operating method according to the present invention.

DETAILED DESCRIPTION OF THE INVENTION

Figure 2A:
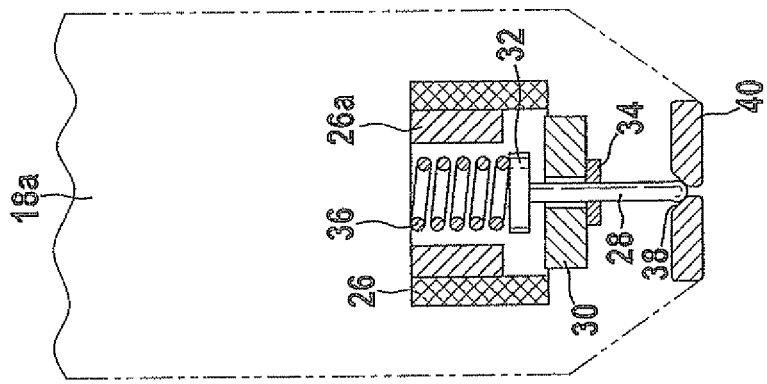
FIGS. 2a through 2c schematically show a detailed view of an injector from FIG. 1 in three different operating states.

An internal combustion engine is denoted overall by reference numeral 10 in FIG. 1. The internal combustion engine includes a tank 12 from which a supply system 14 delivers fuel into a distribution system 16, which is a common rail, for example. Multiple electromagnetically activated injectors 18a through 18d are connected to the distribution system, and inject the fuel directly into combustion chambers 20a through 20d, respectively, associated with the injectors. The operation of internal combustion engine 10 is controlled and regulated by a control and regulation device 22 which also activates injectors 18a through 18d, among other elements.

Figure 2B:
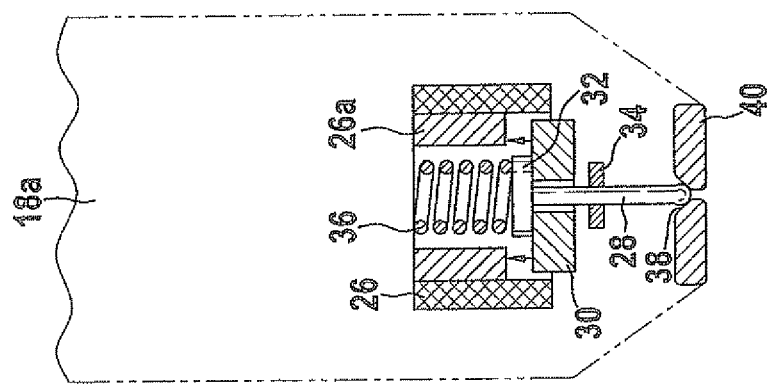
Figure 2C:
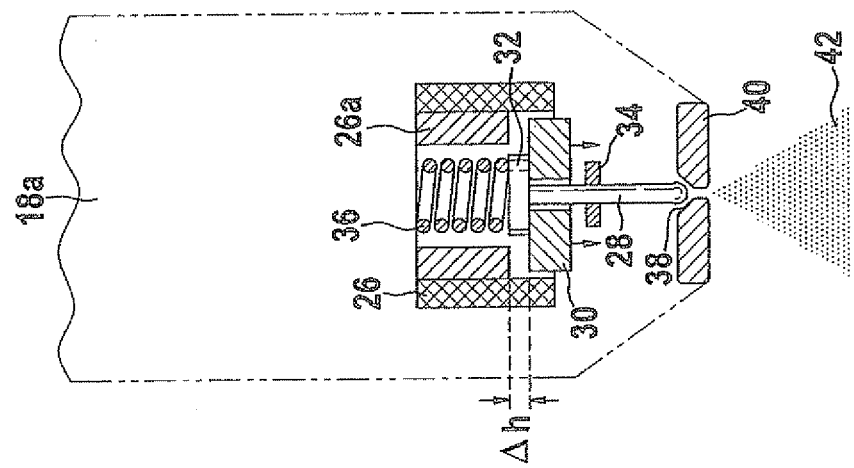

FIGS. 2a through 2c schematically show injector 18a according to FIG. 1 in a total of three different operating states. The other injectors 18b, 18c, 18d illustrated in FIG. 1 have a similar structure and functionality.

Injector 18a has an electromagnetic actuator which has a solenoid 26 and an armature 30 which cooperates with solenoid 26. Armature 30 is connected to a valve needle 28 of injector 18a in such a way that the armature is movable with a nonvanishing mechanical play relative to valve needle 28 in relation to a direction of motion of valve needle 28 which is vertical in FIG. 2a.

This results in a two-part mass system 28, 30 which causes valve needle 28 to be driven by electromagnetic actuator 26, 30. This two-part configuration facilitates installation of injector 18a and reduces undesired rebound of valve needle 28 when it strikes its valve seat 38.

In the configuration illustrated in FIG. 2a, the axial play of armature 30 on valve needle 28 is limited by two stops 32 and 34. However, at least the lower stop 34 in FIG. 2a could also be implemented by a region of the housing of injector 18a.

As illustrated in FIG. 2a, valve needle 28 is acted upon by a valve spring 36 with a corresponding elastic force against valve seat 38 in the region of housing 40. Injector 18a is shown in its closed state in FIG. 2a, in which no fuel injection occurs.

To inject fuel, actuator 26, 30 is acted upon by a control current over a predefinable control period. This energization of solenoid 26 causes armature 30 to move upwardly in FIG. 2b, so that the armature moves valve needle 28 from its valve seat 38, against the elastic force, under engagement with stop 32. This allows fuel 42 to be injected by injector 18a into combustion chamber 20a (FIG. 1); see FIG. 2c.

As soon as control unit 22 (FIG. 1) has stopped the energization of solenoid 26 at the end of the predefined control period, valve needle 28 moves back toward its valve seat 38 under the action of the elastic force exerted by valve spring 36 and carries armature 30 with it. Force is transmitted from valve needle 28 to armature 30, once again via upper stop 32.

When valve needle 28 has completed its closing motion upon striking valve seat 38, armature 30 is able to move farther downward in FIG. 2c due to the axial play until it rests against second stop 34. This corresponds once again to the closed state of injector 18a illustrated in FIG. 2a.

To achieve particularly low injection quantities, the control period for energizing actuator 26, 30 is preferably selected to be so short that valve needle 28 and armature 30 which carries the valve needle in the opening direction do not reach an upper lift stop which limits the opening motion, in the present case the lift stop being formed by a lower end face in FIG. 2c of iron core 26a, which is situated essentially coaxially in solenoid 26. Valve needle 28 and armature 30 accordingly undergo a ballistic trajectory during opening of injector 18a. In the present case, in its upper reversal point according to FIG. 2c, armature 30 has a nonvanishing lift distance Δh from upper lift stop 26a.

In comparison to full lift control, in which valve needle 28 and armature 30 initially reliably reach upper lift stop 26a (i.e., lift distance Δh=0), for short control periods in the ballistic range (reversal point at Δh>0) significant fluctuations result with regard to a closing delay time, which characterizes a time period between an end of the control period and an actual closing point in time of valve 18a. The method according to the present invention, described further below with reference to FIGS. 4a, 4b, allows a substantial increase in the precision of the injection of small fuel quantities, which, in contrast to the full lift region, require ballistic operation of injector 18a.

FIG. 3b schematically shows a time curve of the operating variables control current I and lift h of valve needle 28 (FIG. 2a), which results during a control cycle within the scope of fuel injection.

Electromagnetic actuator 26, 30 of injector 18a is initially energized at point in time $t_{ET0}$ in order to allow lifting of armature 30, and thus also of valve needle 28 from its valve seat 38. Point in time $t_{ET0}$ thus defines a start of control period ET of electromagnetic actuator 26, 30 which is defined by control signal I, and, thus, also of injector 18a.

Figure 3A:
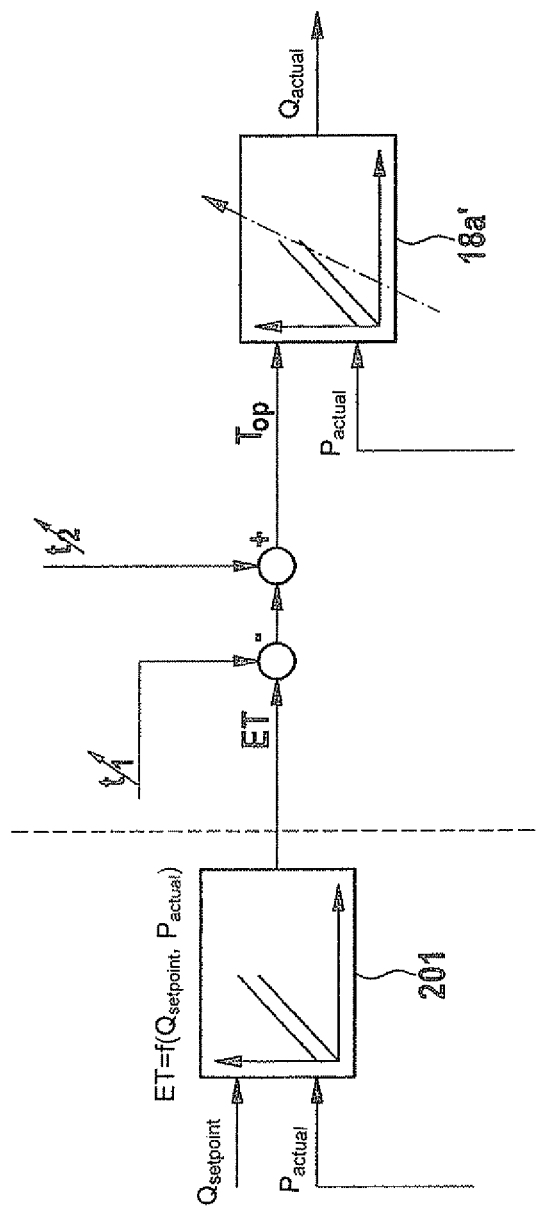
FIG. 3a shows a function diagram for forming a control period according to a conventional method.

FIG. 3a shows an example of a simplified function diagram for ascertaining control period ET of control signal I (FIG. 3b).

In a first function block 201 which is implemented with the aid of a characteristic map, for example, in a conventional operating method, control period ET for activating electromagnetic actuator 26, 30 is ascertained as a function of the operating variables fuel quantity to be injected $Q_{setpoint}$ and fuel pressure $p_{actual}$, using an appropriate current I (FIG. 3b).

During activation of actuator 26, 30 (FIG. 2a) of injector 18a, using control variable I which is ascertained in the conventional manner and which represents control period ET, delay times t11, t2, described in greater detail below, occur as disturbance variables in addition to conventionally ascertained control period ET, resulting in an actual opening time $T_{op}$=ET−t11+t2 for injector 18a. Tolerances which may occur in the high-pressure hydraulic system of injector 18a are indicated by function block 18a' in FIG. 3a. Due to the above-described activation using actual control signal $T_{op}$ and at stated fuel pressure $p_{actual}$, for the conventional system this results in actual injected fuel quantity $Q_{actual}$ at the output of function block 18a', which is generally different from fuel quantity to be injected $Q_{setpoint}$.

FIG. 3b shows a time curve of needle lift h of valve needle (FIG. 2a) which results from activation by control signal I.

Due to the mass inertia, friction effects, and other interference effects, valve needle 28 (FIG. 2a) begins its opening process only after the start of electrical activation $t_{ET0}$, namely, at point in time $t_{öfp}$ in which it moves from bottom to top in FIGS. 2b, 2c, i.e., out of its closed position. As is apparent from FIG. 3b, only at point in time $t_{ET0}$+t1 has valve needle 28 reached a setpoint needle lift $h_{setpoint}$, which corresponds to control signal I. Due to a nonvanishing closing delay time t2, which corresponds to a time period between end $t_{ET1}$ of control period ET and the actual hydraulic closing at point in time $t_s$, fuel is still injected through injector 18a even after end $t_{ET1}$ of control period ET.

As described above, closing delay time t2 is not constant, in particular for very short control periods ET. In particular for strictly ballistic operation, in which valve needle 28 during its opening process does not reach its lift stop 26a, which represents maximum opening, in the region of the iron core, closing delay time t2 may assume greatly different values which are a function, among other things, of the momentum variables of valve needle 28 prior to point in time $t_{ET1}$, i.e., the end of control period ET, as well as of a return spring force, magnetic force, rail pressure, control period, temperature, return back pressure, and/or other variables.

According to the present invention, it is therefore proposed to form control period ET as a function of a setpoint value t2* for closing delay time t2 of valve 18a; closing delay time t2, as previously described, characterizes a time difference between end $t_{ET1}$ of control period ET and actual hydraulic closing point in time $t_s$ of valve 18a.

Figure 4A:
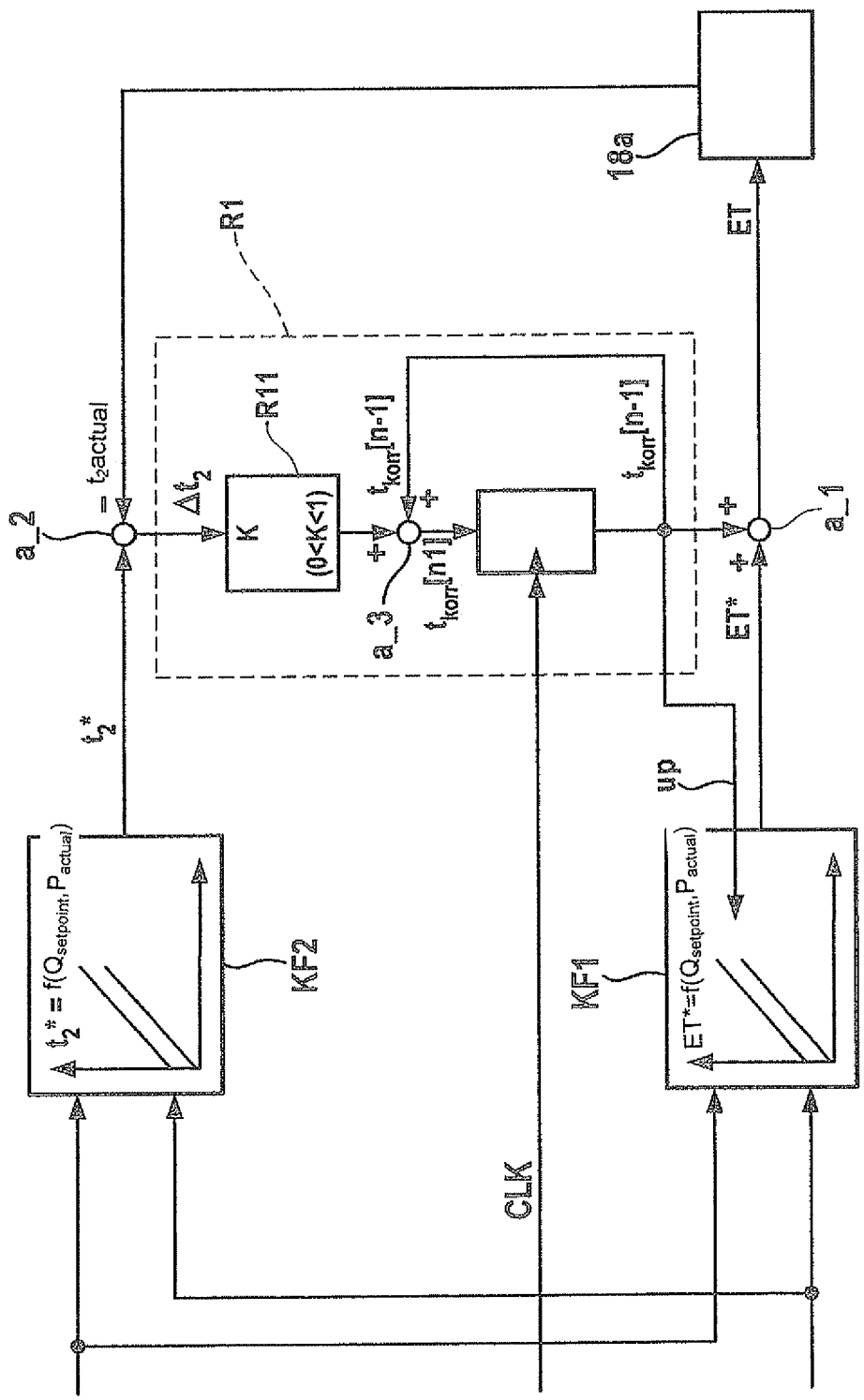
FIG. 4a shows a function diagram of a first specific embodiment of the operating method according to the present invention.

FIG. 4a shows a function diagram of a corresponding first specific embodiment of the method according to the present invention.

A setpoint value ET* for the control period is ascertained with the aid of a first characteristic map KF1 as a function of setpoint injection quantity $Q_{setpoint}$ and as a function of fuel pressure $p_{actual}$.

According to the present invention, setpoint value ET* for the control period is corrected using a correction value $t_{korr}$ [n−1], which in the present case is obtained by adding variable $t_{korr}$ [n−1] to setpoint value ET* with the aid of adder a_1. Control period ET, which is corrected according to the present invention, is present at the output of adder a_1. According to FIG. 4a, signal ET acts on function block 18a, which represents the injector.

A setpoint value t2* for closing delay time t2 is obtained with the aid of a second characteristic map KF2 from input variables $Q_{setpoint}$, $p_{actual}$. At the same time, actual value $t2_{actual}$ of closing delay time t2 is ascertained, for example using a measuring technique which analyzes the time curve of control signal I (FIG. 3b).

A system deviation $\Delta t2 = t2^* - t2_{actual}$ is formed with the aid of adder a_2.

System deviation Δt2 is subsequently multiplied by a predefinable correction factor K in function block R11, a preferred value range for correction factor K being between 0 and 2, in particular between 0 and 1.

Function block R11, in addition to adder a_3 situated downstream therefrom as well as the additional function block situated downstream from adder a_3 and not further identified in FIG. 4a, is a component of a first controller structure R1 according to the present invention which forms correction variable $t_{korr}$ [n−1] as a function of system deviation Δt2.

Consequently, a correction value for a subsequent injection cycle of injector 18a is present at the output of adder a_3, and is computed as follows:

$$t_{korr}[n] = t_{korr}[n-1] + K^* \Delta t2.$$

This means that controller structure R1 currently under consideration is designed as a simple digital controller having an integral characteristic, which allows less complex implementation of the principle according to the present invention. Alternatively or additionally, other controller structures may be used to form correction variable $t_{korr}$ [n] according to the present invention as a function of system deviation Δt2.

In particular, controller structures are also usable which have a proportional integral characteristic or a proportional characteristic, or also nonlinear controllers may be used. Formation of the correction value as a function of system deviation Δt2 is important for the function of the principle according to the present invention.

As the result of one particularly preferred specific embodiment, the function block situated downstream from adder a_3 and not further identified here has a clock input which is supplied with a synchronous speed clock signal CLK, so that the correction value formed according to the present invention may likewise be relayed at a synchronous speed to adder a_1.

The controller structure according to the present invention illustrated in FIG. 4a advantageously allows regulation of closing delay time t2 of injector 18a, and thus, particularly precise injection also of low fuel quantities in a ballistic type of operation of injector 18a.

Figure 4B:
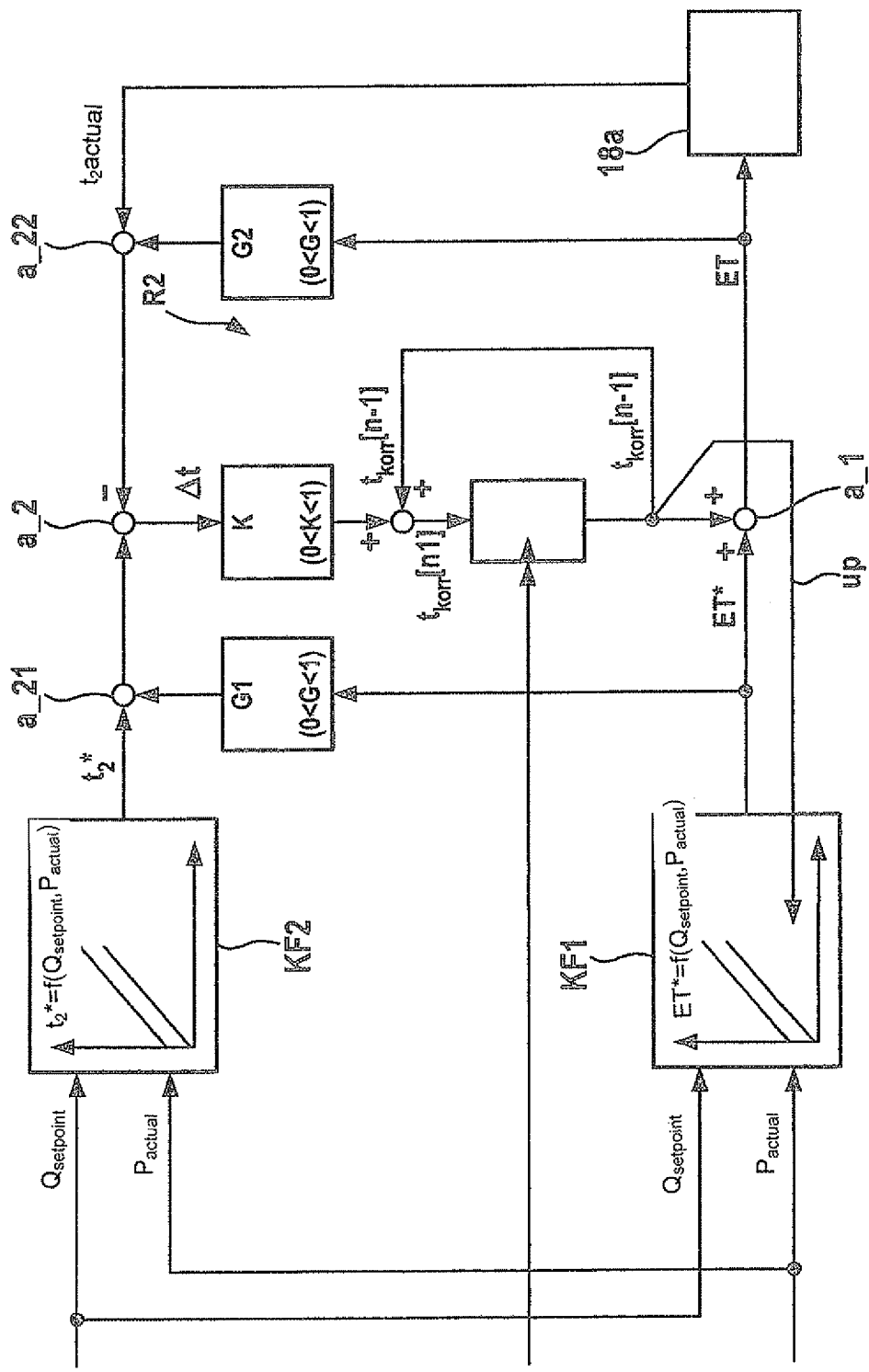
FIG. 4b shows a function diagram of a second specific embodiment of the operating method according to the present invention.

FIG. 4b shows a function diagram of another specific embodiment of the method according to the present invention. In addition to the basic structure previously described with reference to FIG. 4a, the exemplary embodiment according to FIG. 4b has a second controller structure R2 which provides for taking into account setpoint value ET* for control period ET and control period ET itself. For this purpose, variables ET*, ET are weighted with a first weighting factor G1 and a second weighting factor G2, respectively, via function blocks not further described here, before they are added, via adders a_21, a_22, to setpoint value t2* for closing delay time t2, or to actual value $t2_{actual}$ for closing delay time t2.

Adder a_2 subsequently ascertains a variable Δt, comparable to system deviation Δt2 previously described with reference to FIG. 4a, which is used as an input variable for controller structure R2 according to the present invention.

The following applies for input variable Δt:

$$\Delta t = (t2^* + G1^* ET^*) - (t2_{actual} + G2^* ET).$$

Once again a value range of 0 to approximately 1 is provided for weighting factors G1, G2.

As soon as control structures R1, R2 provided in FIGS. 4a, 4b have reached a steady state, which is characterized by a vanishing system deviation Δt2, Δt, characteristic map KF1 may be adapted as a function of correction variable $t_{korr}$ via an update path up. In this case, the correction value supplied to adder a_1 is to be simultaneously set to zero, since the correction value has already been taken into account by the adaptation of characteristic map KF1.

The value of correction factor K is preferably selected to be between 0 and 1. In exceptional cases, an extension of the value range to 0<K<2 is possible; factor K determines the transient speed of control loop R1, R2.

For a rapid transient response, a value for K in the range of approximately 1 is advantageous. If necessary, the robustness of the control loop with respect to interference signals may be increased by decreasing factor K. Thus, for example, increased robustness with respect to interference signals may be achieved with a value K=0.5 without having to make appreciable compromises in the control dynamics of controller R1, R2 according to the present invention. In the event of a control deviation, in tests by the present applicant, controller R1, R2 according to the present invention has stabilized by more than approximately 90% after only approximately four work cycles of injector 18a (FIG. 2a).

Controller structures R1, R2 according to the present invention are characterized by a particularly low degree of complexity, which requires a low level of application effort and contributes to the robustness of the system.

The method according to the present invention has been described above with reference to the type of injector illustrated in FIGS. 2a, 2b, 2c, which is a directly activated injector 18a.

The method according to the present invention may also be used in a particularly advantageous manner for injectors which are not directly driven, i.e., for injectors, for example, in which an electromagnetic actuator activates a component of a control valve, and in which a functional chain which is essentially hydraulic or mechanical exists between the control valve and the valve needle.

FIGS. 5a through 5c show one specific embodiment of an injector 100, provided for fuel injection, of a diesel common rail fuel injection system of an internal combustion engine, in various operating states of an injection cycle.

FIG. 5a shows injector 100 in its rest state in which it is not activated by its associated control unit 22. A solenoid valve spring 111 presses a valve ball 105 into a seat of output throttle 112 provided for this purpose so that a fuel pressure, which corresponds to the rail pressure and which also prevails in the region of high-pressure connection 113, is able to build up in the valve control space.

The rail pressure is also present in chamber volume 109 which encloses valve needle 116 of injector 100. The forces applied by the rail pressure to the end face of control plunger 115 as well as the force of nozzle spring 107 hold valve needle 116 closed against an opening force which acts upon pressure shoulder 108 of valve needle 116.

FIG. 5b shows injector 100 in its open state, which it assumes when activated by control unit 22 in the following manner, starting from the rest state illustrated in FIG. 5a: Electromagnetic actuator 102, 104, which in the present case is formed by solenoid 102 and armature 104 which cooperates with solenoid 102, described in FIG. 5a, is acted upon by control unit 22 with a control current I which forms a control signal, in order to open solenoid 104, 105, 112, which in the present case operates as a control valve. The magnetic force of electromagnetic actuator 102, 104 exceeds the elastic force of valve spring 111 (FIG. 5a), so that armature 104 lifts valve ball 105 from its valve seat, thus opening output throttle 112.

When output throttle 112 is opened, fuel is then able to flow from valve control space 106 into the cavity thereabove according to FIG. 5b (see arrows), and via a fuel return system 101 back to a fuel container, not illustrated. Input throttle 114 prevents complete pressure compensation between the rail pressure present in the region of high-pressure connection 113 and the pressure in valve control space 106, causing the pressure in valve control space 106 to drop. As a result, the pressure in valve control space 106 is less than the pressure in chamber volume 109, which still corresponds to the rail pressure. The reduced pressure in valve control space 106 brings about a correspondingly reduced force on control plunger 115, and thus results in opening of injector 100, i.e., lifting of valve needle 116 from its valve needle seat in the region of spray holes 110. This operating state is illustrated in FIG. 5b.

Subsequently, i.e., after it lifts from the valve needle seat, valve needle 116 undergoes an essentially ballistic trajectory, primarily under the effect of the hydraulic forces in chamber volume 119 and in valve control space 106.

As soon as electromagnetic actuator 102, 104 (FIG. 5a) is no longer activated by control unit 22 at an end of the control period, valve spring 111 pushes armature 104 downwardly, as illustrated in FIG. 5c, causing valve ball 105 to close output throttle 112. This reverses the direction of motion of valve needle 116, so that it is returned to its closed position.

The fuel injection is completed as soon as valve needle 116 reaches its valve needle seat in the region of spray holes 110 and closes same (see FIG. 5c).

The method according to the present invention for correcting the control period as a function of a setpoint value for the closing delay time may also be carried out for the injector, illustrated in FIGS. 5a through 5c and described above, which is activated via a control valve 104, 105, 112.

The electromagnetic actuator of injector 100 may be activated by a control signal I which has a curve comparable to the curve shown in FIG. 3b.

Accordingly, closing delay times also result for injector 100. However, in contrast to the closing delay time of injector 18a described with reference to FIGS. 2a through 2c, the closing delay time for injector 100 according to FIG. 5a may include further time components, not explained in greater detail herein, which result from various state changes or other processes of the electromechanical or hydraulic functional chain which is present between electromagnetic actuator 102, 104 and valve needle 116.

In any case, also for injector 100 according to FIG. 5a, a closing delay time may be defined as the time between the end of control period ET (FIG. 3b) and an actual hydraulic closing point in time at which valve needle 116 once again assumes its closed position in the region of spray holes 110. For application of the principle according to the present invention for injector 100 according to FIG. 5a, it is necessary to determine the actual hydraulic closing point in time, which may be achieved, for example, using acceleration sensors and/or knock sensors or the like which allow the striking of valve needle 116 in its closed position in the region of spray holes 110 to be detected.

The principle according to the present invention may also be applied separately to control valve 104, 105, 112 of injector 100 illustrated in FIG. 5a, which is advantageous, for example, when there is a strong correlation between the state changes of the control valve and valve needle 116, and consequently it may be assumed that regulation according to the present invention of the closing delay time of the control valve alone allows sufficiently precise injection.

In general, the principle according to the present invention is suitable for improving the precision of the fluid metering for ballistically operated injectors in particular, and is not limited to fuel injectors. Unit-to-unit variations may likewise be compensated for in a very advantageous manner by use of the operating method according to the present invention.

The control principle according to the present invention is also advantageously applicable when an injector is ballistically operated only intermittently, i.e., only in some operating cycles.

Depending on the configuration of the injector in question, actual closing delay time $t2_{actual}$ (FIG. 4a) may be ascertained, for example, from a measured time curve of control current I (FIG. 3b) and/or from a voltage applied to the electromagnetic actuator.

Sensor data from separate sensor means, for example structure-borne noise sensors or acceleration sensors, may likewise be evaluated in order to obtain information concerning an actual operating state of components 28, 105, 116 of the injector.

What is claimed is:

1. A method for operating a valve configured as a fuel injector of an internal combustion engine in a motor vehicle, comprising:
activating the valve with the aid of an actuator, wherein the actuator is activated using a control variable which has a control period formed as a function of a setpoint value for a closing delay time of the valve representing a time difference between an end of the control period and a closing point in time of the valve;
during the activating, determining metrologically an actual value of the closing delay time;
determining a system deviation between one of (i) the setpoint value and the actual value for the closing delay time, and (ii) a value derived from the setpoint value and a value derived from the actual value for the closing delay time;

calculating a correction value for a control period of a subsequent activation of the valve, wherein the correction value is calculated by multiplying the system deviation by a feedback factor which has a value between 0 and 2; and applying the correction value to the subsequent activation.

2. The method as recited in claim 1, wherein a setpoint value for the control period of the subsequent activation is modified as a function of the correction value.

3. The method as recited in claim 2, wherein the setpoint value for the closing delay time and the setpoint value for the control period are determined as a function of a setpoint injection quantity and at least one operating variable of the valve characterizing a fuel pressure.

4. The method as recited in claim 1, wherein the correction value is formed with the aid of a controller having an integral action component.

5. The method as recited in claim 4, further comprising:
weighting a setpoint value for the control period of the activating by a predefined weighting factor, and
before determining the system deviation, adding the weighted setpoint value to the setpoint value for the closing delay time.

6. The method as recited in claim 4, wherein the valve has a valve needle which is driven by the actuator, and wherein the driven valve needle undergoes a ballistic trajectory as the result of activation using the control variable.

7. A control unit for operating a valve configured as a fuel injector of an internal combustion engine in a motor vehicle, comprising:
means for activating the valve with the aid of an actuator, wherein the actuator is activated using a control variable which has a control period formed as a function of a setpoint value for a closing delay time of the valve representing a time difference between an end of the control period and a closing point in time of the valve;
means for, during the activating, determining metrologically an actual value of the closing delay time;
means for determining a system deviation between one of (i) the setpoint value and the actual value for the closing delay time and (ii) a value derived from the setpoint value and a value derived from the actual value for the closing delay time;
means for calculating a correction value for a control period of a subsequent activation of the valve, wherein the correction value is calculated by multiplying the system deviation by a feedback factor which has a value between 0 and 2; and
means for applying the correction value to the subsequent activation.

8. A non-transitory computer-readable data storage medium storing a computer program having program codes which, when executed on a computer, performs a method for operating a valve configured as a fuel injector of an internal combustion engine in a motor vehicle, the method comprising:
activating the valve with the aid of an actuator, wherein the actuator is activated using a control variable which has a control period formed as a function of a setpoint value for a closing delay time of the valve representing a time difference between an end of the control period and a closing point in time of the valve;
during the activating, determining metrologically an actual value of the closing delay time;
determining a system deviation between one of (i) the setpoint value and the actual value for the closing delay time, and (ii) a value derived from the setpoint value and a value derived from the actual value for the closing delay time;
calculating a correction value for a control period of a subsequent activation of the valve, wherein the correction value is calculated by multiplying the system deviation by a feedback factor which has a value between 0 and 2; and
applying the correction value to the subsequent activation.

* * * * *